(12) United States Patent
Choi

(10) Patent No.: US 7,311,628 B2
(45) Date of Patent: Dec. 25, 2007

(54) PLANETARY GEAR SET FOR AN AUTOMATIC TRANSMISSION OF A VEHICLE

(75) Inventor: Young Sam Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 177 days.

(21) Appl. No.: 11/300,111

(22) Filed: Dec. 13, 2005

(65) Prior Publication Data

US 2007/0111839 A1    May 17, 2007

(30) Foreign Application Priority Data

Nov. 11, 2005   (KR) .................... 10-2005-0108105

(51) Int. Cl.
*F16H 57/04* (2006.01)
(52) U.S. Cl. .................................... 475/159
(58) Field of Classification Search ............... 475/159, 475/160, 331
See application file for complete search history.

(56) References Cited

U.S. PATENT DOCUMENTS

| 4,648,495 | A | | 3/1987 | Vater et al. | |
|---|---|---|---|---|---|
| 5,609,538 | A | * | 3/1997 | Nogle et al. ................ | 475/159 |
| 5,928,100 | A | * | 7/1999 | Ohtake et al. .............. | 475/159 |
| 6,007,448 | A | * | 12/1999 | Hotta et al. ................ | 475/159 |
| 6,059,682 | A | * | 5/2000 | Friedmann et al. ......... | 475/159 |
| 6,938,512 | B2 | * | 9/2005 | Tanikawa .................... | 74/467 |
| 7,083,537 | B2 | * | 8/2006 | Knowles et al. ............ | 475/116 |
| 7,097,582 | B2 | * | 8/2006 | Bauknecht et al. ......... | 475/159 |
| 7,232,022 | B2 | * | 6/2007 | Aoki et al. ............... | 192/106 F |
| 2005/0197226 | A1 | * | 9/2005 | Yamamura et al. ......... | 475/159 |
| 2005/0209039 | A1 | * | 9/2005 | Kempf ....................... | 475/159 |

FOREIGN PATENT DOCUMENTS

| JP | 02-163557 | 6/1990 |
|---|---|---|
| JP | 02-173458 | 7/1990 |
| JP | 06-058381 | 3/1994 |
| JP | 08-319810 | 12/1996 |
| JP | 2000-274517 | 10/2000 |
| JP | 2003-049931 | 2/2003 |
| KR | 10-0342033 B1 | 6/2002 |

* cited by examiner

*Primary Examiner*—Tisha Lewis
(74) *Attorney, Agent, or Firm*—Morgan Lewis & Bockius LLP

(57) ABSTRACT

A planetary gear set for an automatic transmission of a vehicle includes a central shaft having a main lubrication path and a penetration hole connected with the main lubrication path, a sun gear, a pinion gear, a ring gear, a planet carrier, a first bearing disposed between a side of the sun gear and the planet carrier, a second bearing disposed between the planet carrier and the pinion gear, a clutch hub shaft, a sun gear lubrication path that connects the main lubrication path to the first bearing through the penetration hole, a pinion gear lubrication path that connects the main lubrication path to the second bearing through the penetration hole, and a sealing element disposed in a passageway connecting the pinion gear lubrication path and the sun gear lubrication path so as to close the passageway.

2 Claims, 2 Drawing Sheets

PLANETARY GEAR SET FOR AN AUTOMATIC TRANSMISSION OF A VEHICLE

CROSS-REFERENCE TO RELATED APPLICATION

This application claims priority to and the benefit of Korean Patent Application No. 10-2005-0108105 filed in the Korean Intellectual Property Office on Nov. 11, 2005, the entire contents of which are incorporated herein by reference.

BACKGROUND OF THE INVENTION (a) Field of the Invention

The present invention relates to a planetary gear set for an automatic transmission of a vehicle. More particularly, the present invention relates to a planetary gear set for an automatic transmission of a vehicle where a sealing element is provided so as to close a passageway connecting a sun gear lubrication path and a pinion gear lubrication path.

(b) Description of the Related Art

In a conventional planetary gear set of an automatic transmission, the lubrication oil for lubricating a needle bearing of a pinion gear is supplied to the needle bearing through a thrust bearing, which assists rotation of the sun gear. Therefore, since the lubrication oil is heated by the thrust bearing before being supplied to the needle bearing, the lubrication oil cannot sufficiently assist the rotation of the thrust bearing.

The above information disclosed in this background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a planetary gear set for an automatic transmission of a vehicle having advantages of improved lubrication of the planetary gear set.

A planetary gear set for an automatic transmission of a vehicle according to an exemplary embodiment of the present invention includes: a central shaft having a main lubrication path formed therein and a penetration hole formed at a side thereof to be connected with the main lubrication path; a sun gear coupled to the central shaft such that the sun gear and the central shaft rotate with respect to a same axis; a pinion gear engaged with the sun gear; a ring gear engaged with the pinion gear; a planet carrier rotatably supporting the pinion gear; a first bearing disposed between one side of the sun gear and the planet carrier; a second bearing disposed between an outer circumferential surface of the planet carrier and the pinion gear; a clutch hub shaft extended from between the sun gear and the central shaft to between the planet carrier and the central shaft; a sun gear lubrication path formed to connect the main lubrication path to the first bearing through the penetration hole; a pinion gear lubrication path formed to connect the main lubrication path to the second bearing through the penetration hole; and a sealing element disposed in a passageway connecting the pinion gear lubrication path and the sun gear lubrication path so as to close the passageway.

The first bearing may be a thrust bearing, and the second bearing may be a needle bearing.

DETAILED DESCRIPTION OF THE PREFERRED EMBODIMENTS

Figure 1:
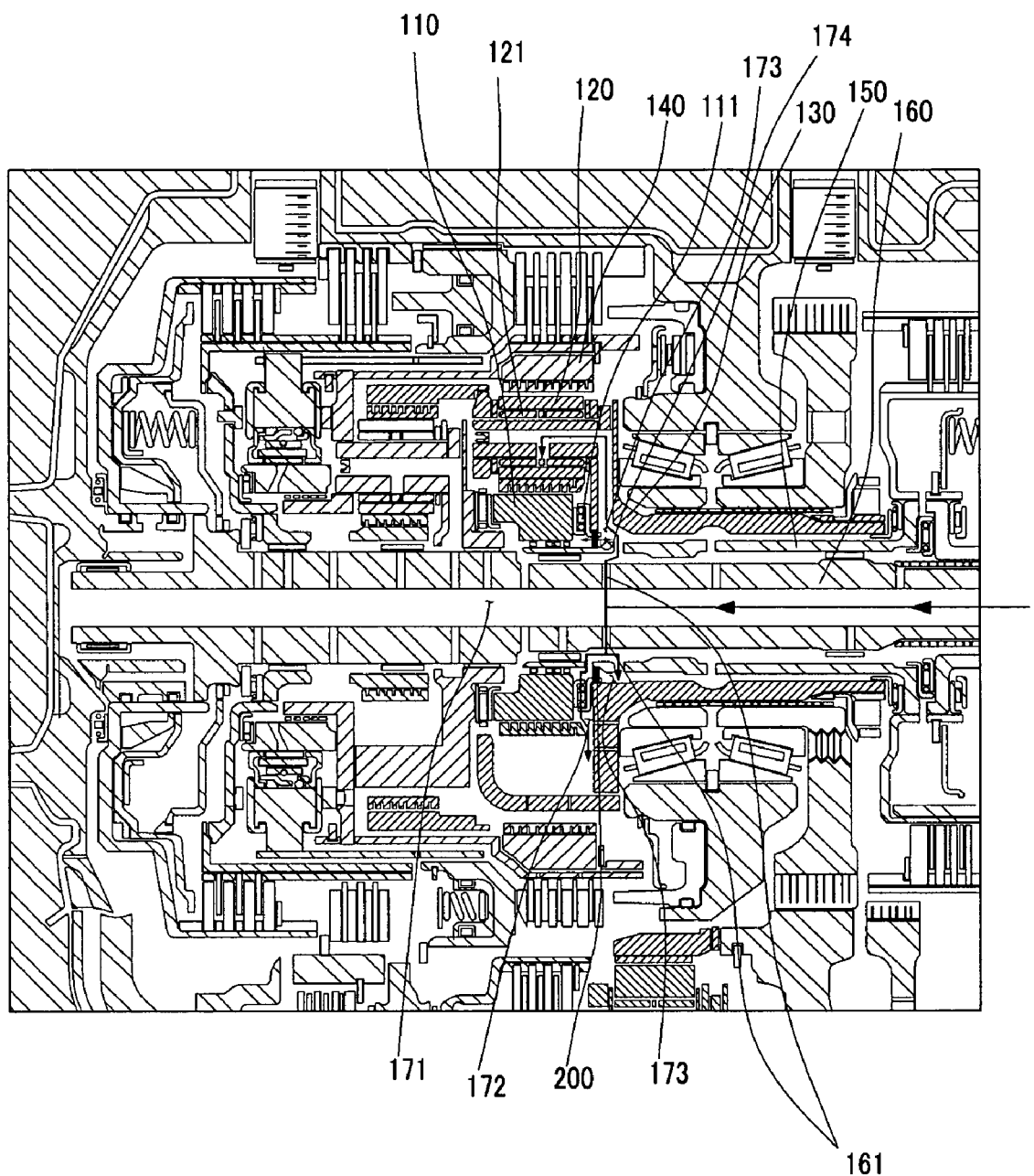
FIG. 1 is a schematic cross-sectional view of a planetary gear set of an automatic transmission according to an exemplary embodiment of the present invention.
Figure 2:
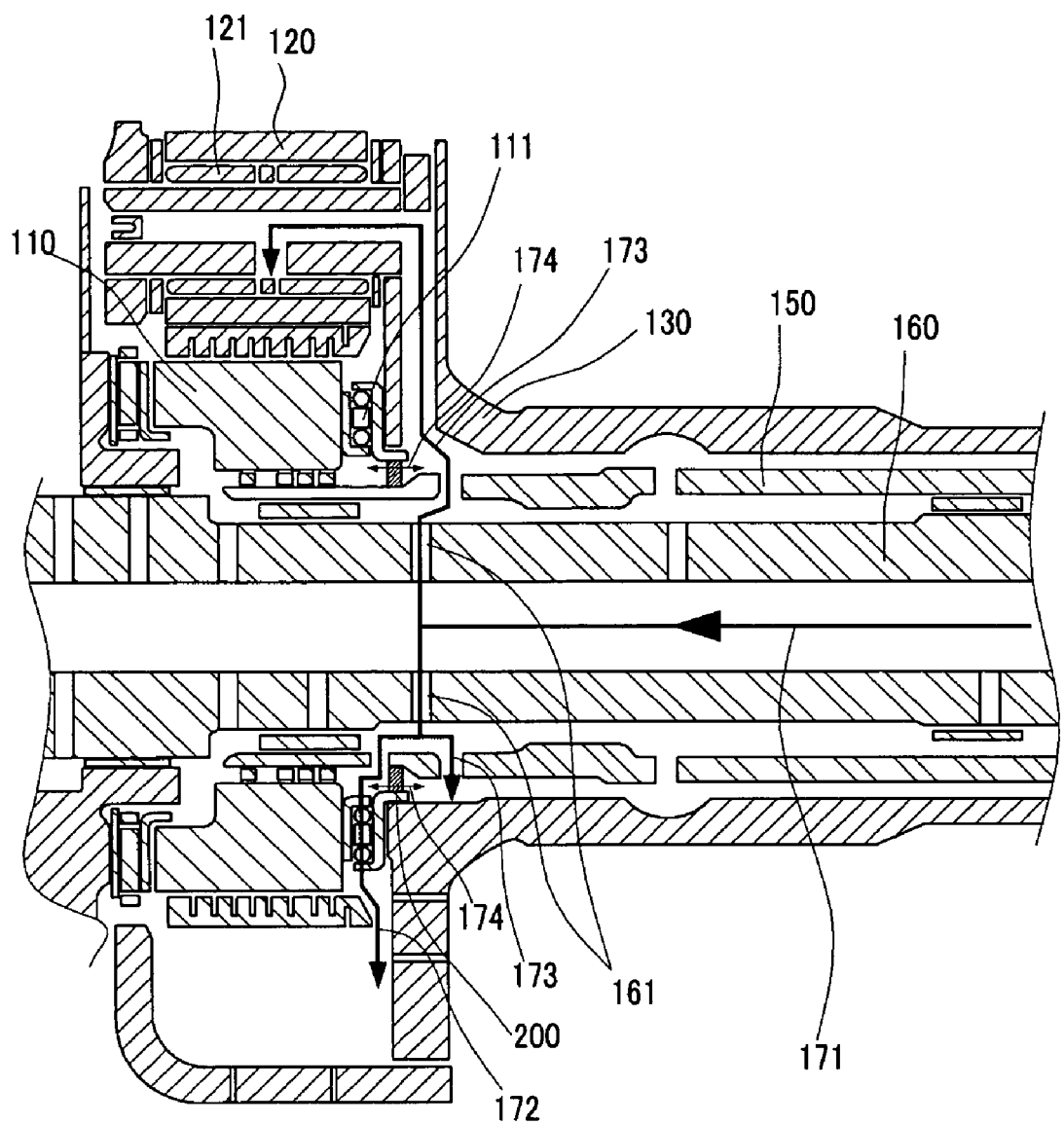
FIG. 2 is an enlarged partial view of FIG. 1.

An exemplary embodiment of the present invention will hereinafter be described in detail with reference to the accompanying drawings.

A sun gear 110 is coupled to a central shaft 160 having a hollow space formed therein, such that the sun gear 110 and the central shaft 160 rotate with respect to a same axis of rotation. A pinion gear 120 is provided to be engaged with the sun gear 110, and a ring gear 140 is provided to be engaged with the pinion gear 120.

The pinion gear 120 is rotatably supported by a planet carrier 130. A first bearing 111 is disposed between a side of the sun gear 110 and the planet carrier 130, and a second bearing 121 is disposed between an outer circumferential surface of the pinion gear 120 and the planet carrier 130.

In one embodiment, the first bearing 111 is a thrust bearing, and the second bearing 121 is a needle bearing.

A clutch hub shaft 150 is disposed at a center of the sun gear 110, and is extended along the central shaft 160 to a forward clutch (not shown). The clutch hub shaft 150 delivers power to the sun gear 110.

Inside the central shaft 160, a main lubrication path 171 is formed. A penetration hole 161 is formed at a side of the central shaft 160 so as to allow lubrication oil to flow therethrough. The main lubrication path 171 is connected with a sun gear lubrication path 172 and a pinion gear lubrication path 173 through the penetration hole 161.

The sun gear lubrication path 172 is formed to lubricate the first bearing 111. Through the sun gear lubrication path 172, the lubrication oil flows into the first bearing 111.

The pinion gear lubrication path 173 is formed to lubricate the second bearing 121. Through the pinion gear lubrication path 173, the lubrication oil flows into the second bearing 121.

Therefore, the main lubrication path 171 is divided into the pinion gear lubrication path 173 for lubricating the second bearing 121 and the sun gear lubrication path 172 for lubricating the first bearing 111.

The pinion gear lubrication path 173 and the sun gear lubrication path 172 communicate with each other through a passageway 174 formed at an outer portion of the clutch hub shaft 150.

A sealing element 200 is disposed at the passageway 174. The sealing element 200 may be made of an elastic material that is strong at high temperatures. The sealing element 200 closes the sub path 174, and prevents a flow of the lubrication oil through the sub path 174.

According to an exemplary embodiment of the present invention, since the sealing element 200 prevents a flow between the sun gear lubrication path 172 and the pinion gear lubrication path 173, the lubrication oil in either of the two paths does not affect the other path. Therefore, the lubrication is more efficient.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear set for an automatic transmission of a vehicle, comprising:
   a central shaft comprising a main lubrication path and a penetration hole, wherein said penetration hole is connected with said main lubrication path;
   a sun gear coupled to the central shaft, wherein said sun gear and said central shaft are rotatable about an axis;
   a pinion gear engaged with the sun gear;
   a ring gear engaged with the pinion gear;
   a planet carrier rotatably supporting the pinion gear;
   a first bearing disposed between a side of the sun gear and the planet carrier;
   a second bearing disposed between the planet carrier and the pinion gear;
   a clutch hub shaft comprising a first end and a second end, said first end being disposed between the sun gear and the central shaft and said second end being disposed between the planet carrier and the central shaft;
   a sun gear lubrication path comprising a first end, a second end, and a central portion, said first end being disposed in said penetration hole of said central shaft and said second end being disposed at said first bearing;
   a pinion gear lubrication path comprising a first end, a second end, and a central portion, said first end being disposed in said penetration hole of said central shaft and said second end being disposed at said second bearing;
   a passageway comprising a first end, a second end, and a central portion, said first end being disposed at said central portion of said sun gear lubrication path and said second end being disposed at said central portion of said pinion gear lubrication path;
   a sealing element disposed in said central portion of said passageway.

2. The planetary gear set for an automatic transmission of a vehicle of claim 1, wherein
   the first bearing is a thrust bearing, and
   the second bearing is a needle bearing.

* * * * *